United States Patent

Shinozaki et al.

[11] Patent Number: 6,155,148
[45] Date of Patent: Dec. 5, 2000

[54] THREAD CUTTING METHOD USING LATHE AND NUMERICAL CONTROLLER

[75] Inventors: Satoru Shinozaki, Shimodate; Susumu Nagayama, Fujiyoshida, both of Japan

[73] Assignee: Fanuc Ltd., Yamanashi, Japan

[21] Appl. No.: 09/101,875

[22] PCT Filed: Dec. 10, 1997

[86] PCT No.: PCT/JP97/04547

§ 371 Date: Jul. 20, 1998

§ 102(e) Date: Jul. 20, 1998

[87] PCT Pub. No.: WO98/25724

PCT Pub. Date: Jun. 18, 1998

[30] Foreign Application Priority Data

Dec. 10, 1996 [JP] Japan .................................. 8-344469

[51] Int. Cl.[7] ...................................................... B23B 1/00
[52] U.S. Cl. ............................. 82/1.11; 82/47; 82/118; 82/110; 364/474.22; 409/66
[58] Field of Search ........................... 82/1.11, 110, 118, 82/47; 409/66, 68, 69; 364/474.22, 474.32, 474.33

[56] References Cited

U.S. PATENT DOCUMENTS

| 3,854,353 | 12/1974 | Cutler | 82/110 X |
| 4,513,380 | 4/1985 | Spooner | 82/110 X |
| 4,580,225 | 4/1986 | Thompson | 82/110 X |
| 4,789,943 | 12/1988 | Yamanaka et al. | 82/110 X |
| 5,044,842 | 9/1991 | Miyata et al. | 82/118 X |
| 5,112,169 | 5/1992 | Ryoki et al. | 409/69 X |
| 5,274,564 | 12/1993 | Sugita et al. | 82/118 X |
| 5,453,674 | 9/1995 | Masaki et al. | . |

FOREIGN PATENT DOCUMENTS

| 58-132439 | 8/1983 | Japan . |
| 4-8423 | 1/1992 | Japan . |
| 5-46236 | 2/1993 | Japan . |
| 5-50329 | 3/1993 | Japan . |
| 08185211 | 7/1996 | Japan . |

*Primary Examiner*—Henry W. H. Tsai
*Attorney, Agent, or Firm*—Staas & Halsey LLP

[57] ABSTRACT

A basic spiral operation of a tool is controlled by storing, in a controller, an automatic operation program of a threading cycle which regulates the basic spiral operation of the tool corresponding to a thread shape by specifying a spindle revolving speed RC, a thread lead ZR and a thread cutting finish point Z2 or the like. A depth of cut by the tool is determined by an operator who operates a handle of a manual pulse generator to cut the work and confirms the cutting conditions.

7 Claims, 5 Drawing Sheets

THREAD CUTTING METHOD USING LATHE AND NUMERICAL CONTROLLER

FIELD OF THE INVENTION

This invention relates to a thread cutting method using a lathe and to a numerical controller for causing the lathe to perform thread cutting.

DESCRIPTION OF THE RELATED ART

It is well known to perform thread cutting by a method including the steps of generating a machining program by inputting a thread shape and specifying a spindle revolving speed, a thread lead and a depth of cut for one cutting operation, and performing an automatic thread cutting operation by a controller. Further, it is also well known to perform thread cutting manually by a method including the step of putting a tool into contact with a work from a direction orthogonal to a spindle by operating a handle manually, while applying automatic feed to the tool in a work axial direction by a thread cutting lathe having an apron feed function.

In case of the former thread cutting method, it is necessary to examine a machining program for thread cutting thoroughly in advance, in particular, to set appropriate data with respect to a depth of cut or the like. This is due to the fact that it is difficult to vary a depth of cut or the like in the course of an automatic operation. However, since there are many sorts of steel materials of a work or thread cutting tools, it is also quite difficult to estimate and set an optimum depth of cut in the design stage of thread cutting.

If a thread cutting lathe having an apron feed function is used for cutting by a manual operation, it is possible to find an appropriate cutting amount manually while confirming cutting conditions, whereas a difficulty arises in deciding a thread cutting finish position and a depth of cut or the like with accuracy.

SUMMARY OF THE INVENTION

It is an object of the present invention to provide a thread cutting method in a lathe, which can overcome defects in the prior art, can realize a thread cutting finish position and a depth of cut or the like with accuracy on the basis of design data, and besides, can set an appropriate cutting amount while confirming cutting conditions.

In order to attain the above object, in a thread cutting method using a lathe, which performs thread cutting by revolving a work mounted on a spindle of the lathe, then cutting the work by putting a tool into contact with the work from a direction orthogonal to the spindle, and moving the tool relatively to the work in a work axial direction in synchronization with the revolution of the spindle, a thread cutting method using the lathe according to the present invention comprises the steps of specifying a spindle revolving speed, a thread lead and the thread shape; storing a machining program having a threading cycle which regulates a basic spiral operation of the tool corresponding to said a thread shape; and performing thread cutting by executing said machining program while determining a depth of cut by moving the tool manually.

It is preferable that the depth of cut determined by moving the tool manually by an operator in execution of the machining program is stored in a controller, and the next thread cutting start point is determined on the basis of the stored depth of cut.

It is more preferable that the machining program comprises an operation to move the tool from a thread cutting start point to a thread cutting end point relatively to the work, and an operation to retreat the tool from the thread cutting end point to a machining start point, and there is provided a manual operation means for regulating a limit position of an approach operation for moving the tool from the machining start point to the thread cutting start point according to a position of the thread cutting start point determined on the basis of the depth of cut, and also removing the regulation on the limit position.

Further, according to the present invention, a numerical controller for causing the lathe to perform thread cutting comprises a machining program storage means for storing an automatic operation program of a thread cutting cycle, an input unit with display screen for inputting and displaying various data required for execution of the machining program, a data storage means for storing the data inputted from the input unit with display screen, a manual pulse handle for moving a thread cutting tool by a manual operation in a cutting direction relatively to a work mounted on a spindle, and a machining program creating means for creating a semiautomatic operation program for performing predetermined thread cutting to the work by applying not only the various data stored in the data storage means, except the data representing a depth of cut for one machining cycle, but also the data representing a depth of cut corresponding to a manipulated variable of the manual pulse handle to the automatic operation program stored in the machining program memory means.

It is more preferable that the numerical controller further comprises a decision means for deciding as to whether or not, with a depth of cut commanded by the manual pulse handle, the tool would cut the work in excess of the final depth of cut inputted by the input unit with display screen, and a depth regulating means for automatically altering a current depth of cut into the final depth of cut when the decision means decides that, with the current manipulated variable of the manual pulse handle, the tool would cut the work in excess of the final depth of cut.

It is more preferable that the numerical controller further comprises a regulation removing means for permitting cutting corresponding to the manipulated variable of the manual pulse handle without limitation by removing the regulation placed on the depth of cut by the depth regulating means.

It is more preferable that the numerical controller further comprises a typical depth storage means for, when a thread cutting operation in a machining cycle is ended, obtaining and storing a typical depth of cut in a thread cutting in the machining cycle; and a cutting depth regulating means for making a regulation such that the manipulated variable of said manual pulse handle does not exceed the typical depth of cut stored in said typical depth storage means in a thread cutting operation in the next machining cycle.

As described above, according to the present invention, since the machine causes the tool to automatically perform the basic spiral operation determined by the spindle revolving speed, the thread lead and the thread shape, there is no possibility that a dispersion in thread length occurs due to a misoperation by the operator. Besides, since the operator can determine a depth of cut caused by the tool at will on the basis of an operator's experience while confirming the cutting conditions of the work, and further can adjust the depth of cut caused by the tool at will even in the course of thread cutting, it is possible to perform appropriate thread cutting even in case where the operator is not able to estimate the optimum depth of cut in the design and planning stage of thread cutting.

Further, since the limit position of the approach operation to move the tool from the machining start point to the thread cutting start point is regulated by the depth of cut in thread cutting performed immediately before the approach operation, it is possible to locate the tool accurately at the thread cutting start point in thread cutting on the next occasion without thrusting the tool into the work carelessly, even in case where the operator performs the approach operation manually. Further, since the tool is moved to perform cutting after the regulation on the limit position is removed, it is possible to grasp a depth of cut in newly applied thread cutting with accuracy.

DESCRIPTION OF THE PREFERRED EMBODIMENTS

Hereinafter will be described an embodiment of the present invention with reference to the accompanying drawings.

Figure 1:
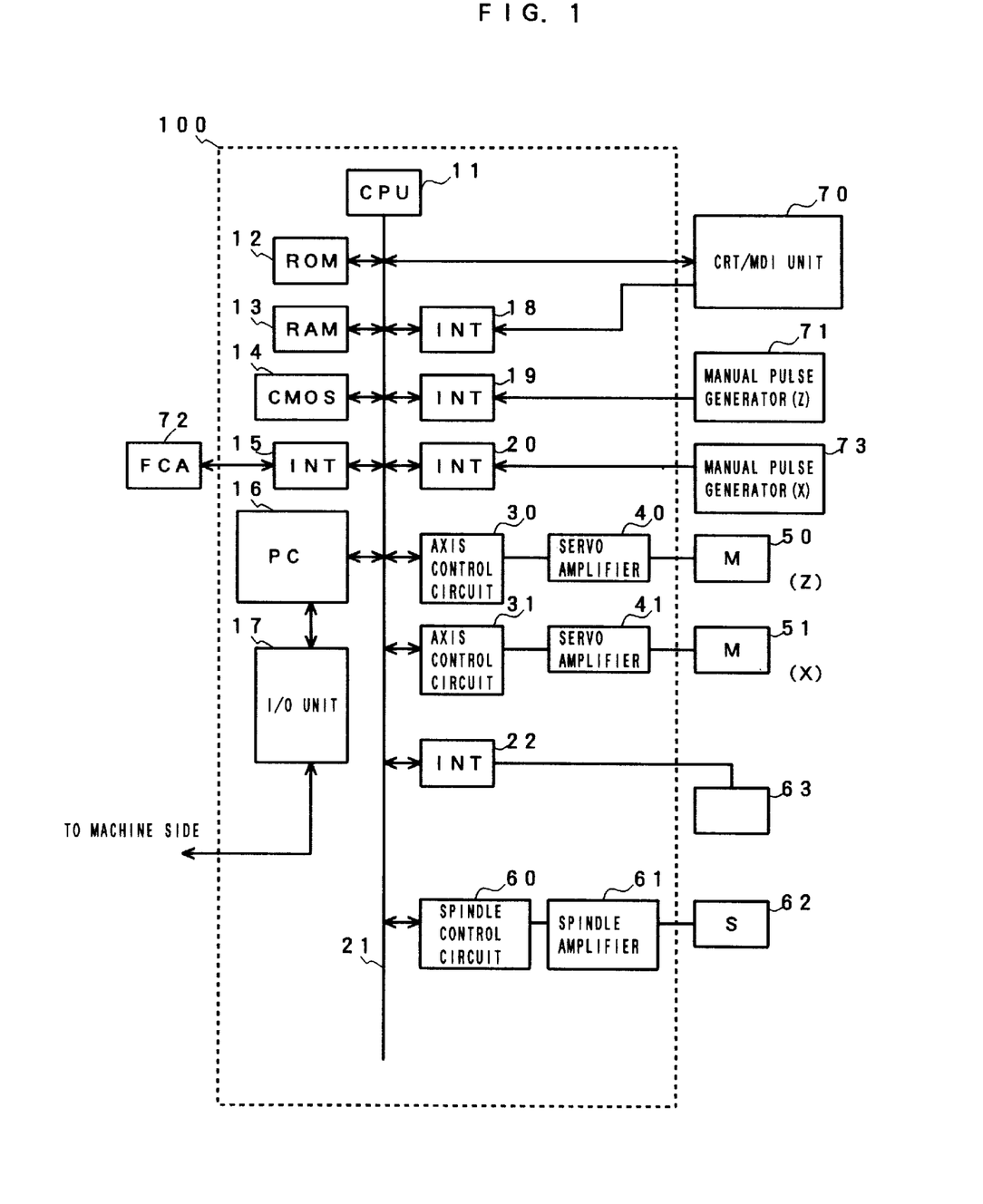
FIG. 1 is a functional block diagram showing an essential part of a controller for controlling drive of a NC lathe, to which a method of the present invention is applied.

FIG. 1 is a functional block diagram showing an essential part of a controller 100 for controlling drive of an NC lathe, to which the method of the present invention is applied.

The controller 100 has a processor 11 which controls the whole of the controller 100, and this processor 11 reads out a system program stored in a ROM 12 through a bus 21 and controls the whole of the controller 100 according to the read-out system program. Temporary calculation data, display data and various data or the like inputted by an operator through a CRT/MDI unit 70 are stored in a RAM 13.

A CMOS memory 14 is configured as a non-volatile memory, which is backed up by a battery (not shown) and can preserve storage contents even if power of the controller 100 is turned off, so that a machining program read through an interface 15 and a machining program inputted through the CRT/MDI unit 70 or the like are stored in the CMOS memory.

Further, various system programs for performing the processing required for writing and editing of a machining program or the processing for an automatic operation are stored in the ROM 12 in advance.

The interface 15 is an interface for an external equipment capable of being connected to the controller 100, and an external equipment 72 such as a floppy cassette adapter is connected to the interface 15. A machining program or the like is read through the external equipment 72, while a machining program edited in the controller 100 can be stored in a floppy cassette or the like through the external equipment 72.

A programmable controller 16 controls an auxiliary device on the NC lathe side, for example, an actuator such as a robot hand for exchange of tools by a sequence program incorporated in the controller 100. That is, according to M, S and T functions commanded by the machining program, the programmable controller 16 makes a conversion into a signal required on the auxiliary device side by the sequence program and outputs the signal to the auxiliary device side through an I/O unit 17. The auxiliary devices such as various actuators are actuated in response to this output signal. Further, the programmable controller 16 performs the necessary processing in response to signals from various switches of a control panel arranged on a body of the NC lathe and transfers the processing to the processor 11.

An image signal representing a current position of each axis of the NC lathe, an alarm, a parameter, image data or the like is sent to the CRT/MDI unit 70 and is displayed on a display of the CRT/MDI unit. The CRT/MDI unit 70 includes a manual data input unit equipped with a display and a keyboard or the like, and an interface 18 receives data from the keyboard of the CRT/MDI unit 70 and transfers the data to the processor 11.

An interface 19 is connected to a manual pulse generator 71 for Z axis and receives a pulse from the manual pulse generator 71. The manual pulse generator 71 is mounted on the control panel of the NC lathe and is used to determine the position of a tool rest of the NC lathe with precision by controlling each axis by a distribution pulse based on a manual operation. The same may be said of a manual pulse generator 73 for X axis and an interface 20. Incidentally, the manual pulse generator 71 for Z axis is used to perform feed in parallel to a spindle, the manual pulse generator 73 for X axis is used to perform feed in a direction (a cutting direction) orthogonal to the spindle, and axis control circuits 30 and 31 for Z and X axes for moving the tool rest of the NC lathe respectively receive move commands for Z and X axes from the processor 11 and output the commands for Z and X axes to servo amplifiers 40 and 41. The servo amplifiers 40 and 41 respectively receive these commands and drive servo motors 50 and 51 for Z and X axes of the NC lathe. A position/speed detector is incorporated in each of the servo motors 50 and 51 for Z and X axes, and position and speed feedback signals are fed back from the position/speed detector. In FIG. 1, a description of feedback of the position signal and that of the speed signal are omitted.

A spindle control circuit 60 receives a command to the NC lathe to revolve the spindle and outputs a spindle speed signal to a spindle amplifier 61. The spindle amplifier 61 revolves a spindle motor 62 of the NC lathe at a commanded speed in response to the spindle speed signal and revolvingly drives a chucked work. A position coder 63 is coupled to the spindle motor 62 through a gear, a belt or the like and outputs a feedback pulse (including one revolution signal) in synchronization with the revolution of the spindle, and the feedback pulse is read by the processor 11 via the interface 22.

Although it is a matter of course that a full automatic operation can be performed by generating a thread cutting program according to a method similar to the prior art of inputting a thread shape to the controller 100 and then specifying a spindle revolving speed, a thread lead and a depth of cut for one cutting operation or the like, a description will now be given of the processing in case of a semiautomatic operation to perform thread cutting by storing, in the controller 100, an automatic operation program of a threading cycle, which regulates a basic spiral operation of the tool, and then adjusting a depth of cut while confirming the cutting conditions by feeding the tool manually by the use of the manual pulse generator 73 during the execution of this threading cycle.

Since a Z-axis coordinate value Z2 given as a coordinate value of an end point of the thread shape, a thread lead ZR, a thread height H, a work outer diameter X1 (a radius) or like thread shape data and a spindle revolving speed RC (rpm) are at least required for specifying the threading cycle which regulates the basic spiral operation of the tool, it is configured to store these data in the RAM 13 through the CRT/MDI unit 70 in advance. Further, it is also configured to store data, which represents whether or not chamfering (thread recessing) is to be made, or the like data in the RAM 13 in advance.

Figure 5:
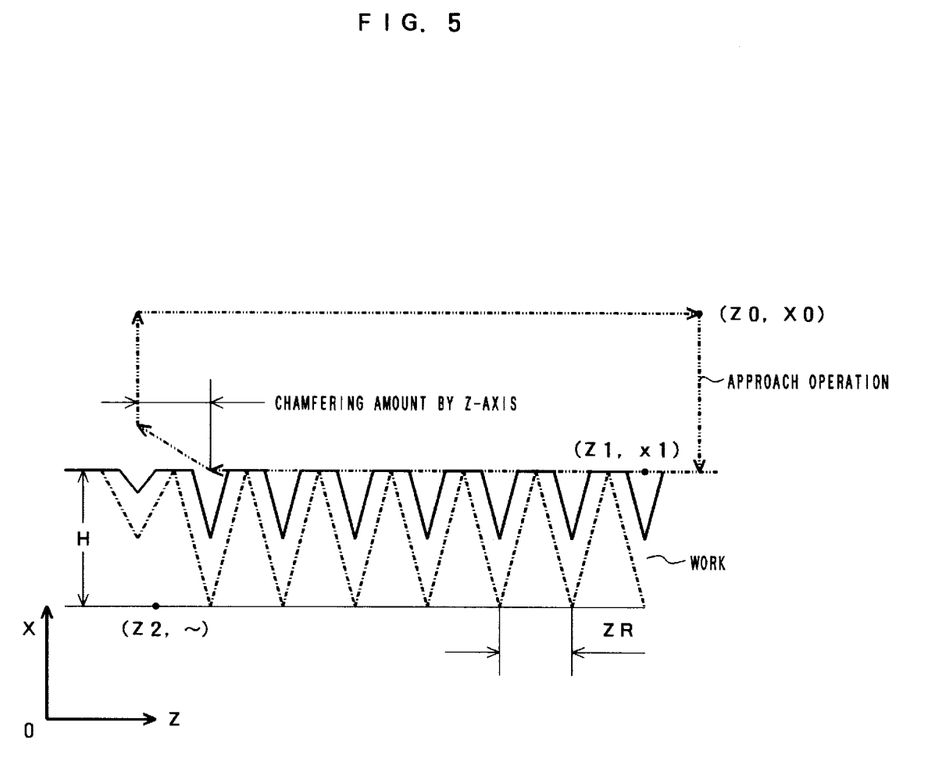
FIG. 5 is a view for explaining the semiautomatic operation related to thread cutting.

FIG. 5 shows an embodiment in case of threading an end portion of a work by chucking the work from the left side. In FIG. 5, a direction extending from a chuck to the end of the work (i.e., a direction from the left to the right) is given as a positive direction of Z axis, and an origin of X axis orthogonal to the Z axis lies on the Z axis.

In case of starting the semiautomatic operation, an operator firstly puts the controller 100 in a semiautomatic operation mode, then operates the manual pulse generators 71 and 73 for Z and X axes to move the tool rest and locates the end of the tool at an appropriate machining start position. In the embodiment shown in FIG. 5, the tool is allowed to escape from the end of the work in a direction of +Z and, besides, is offset from a work outer diameter X1 in a direction of +X (outside in a radial direction).

Figure 2:
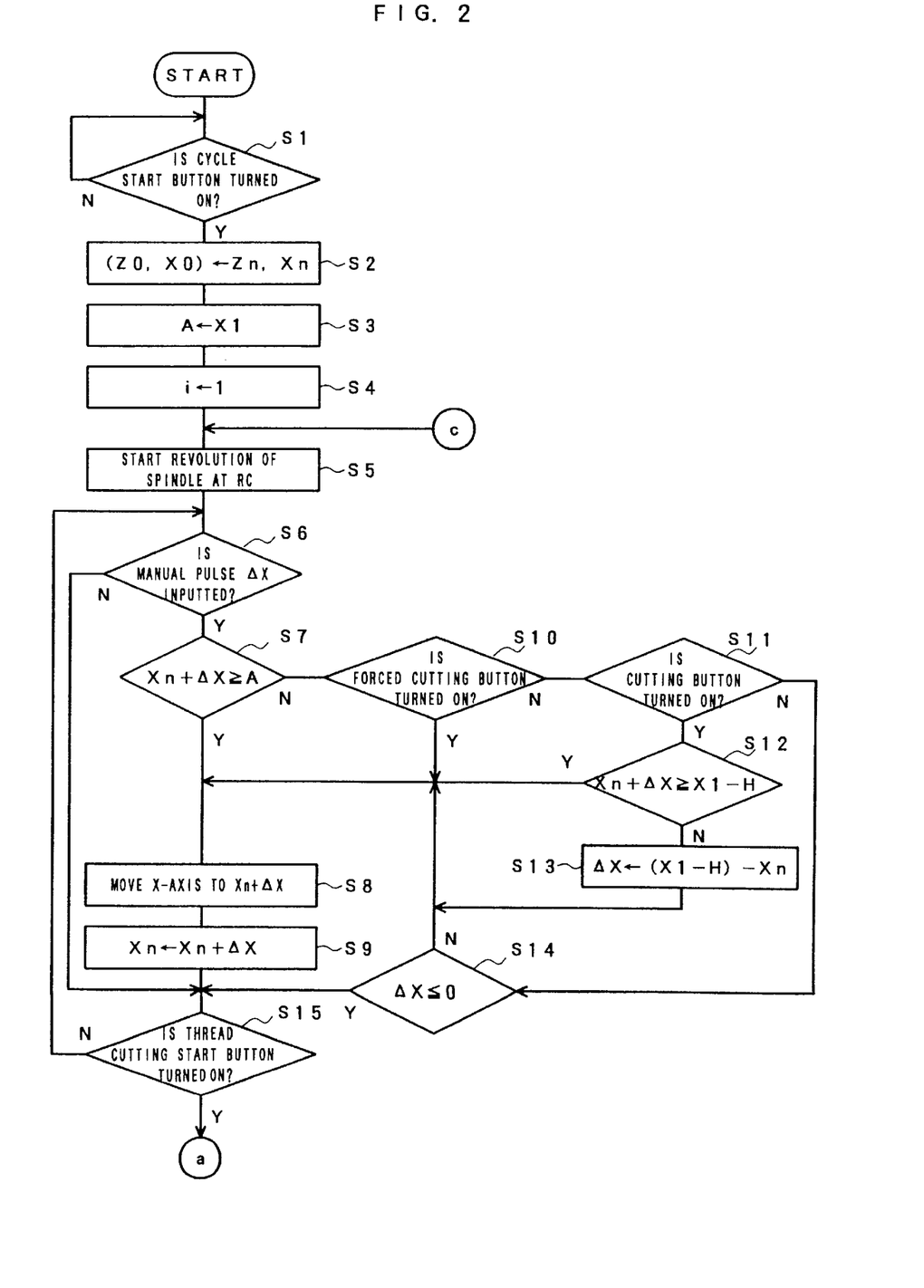
FIG. 2 is a flow chart showing (a part of) an outline of a semiautomatic operation process related to thread cutting.
Figure 3:
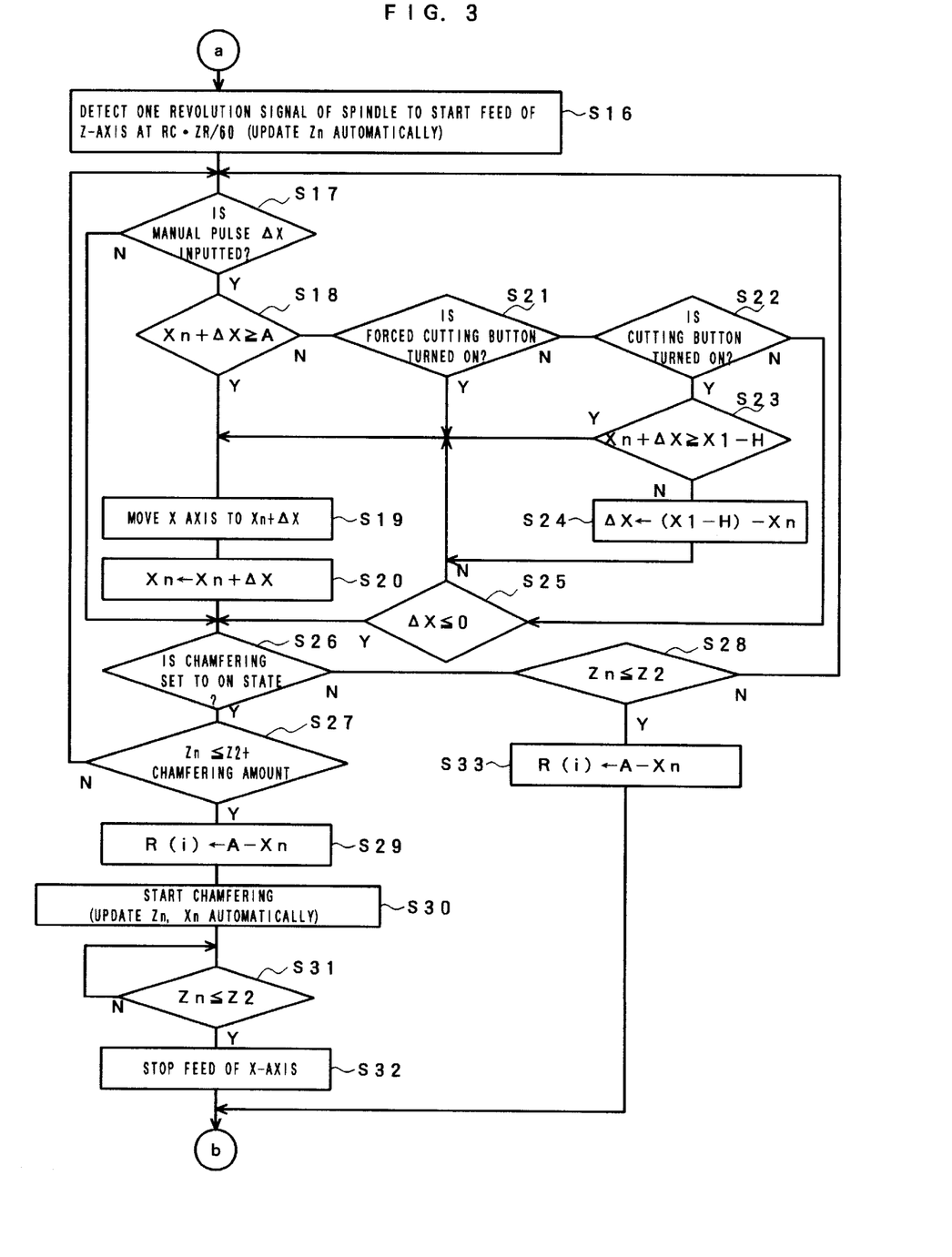
FIG. 3 is a flow chart subsequent to that shown in FIG. 2.
Figure 4:
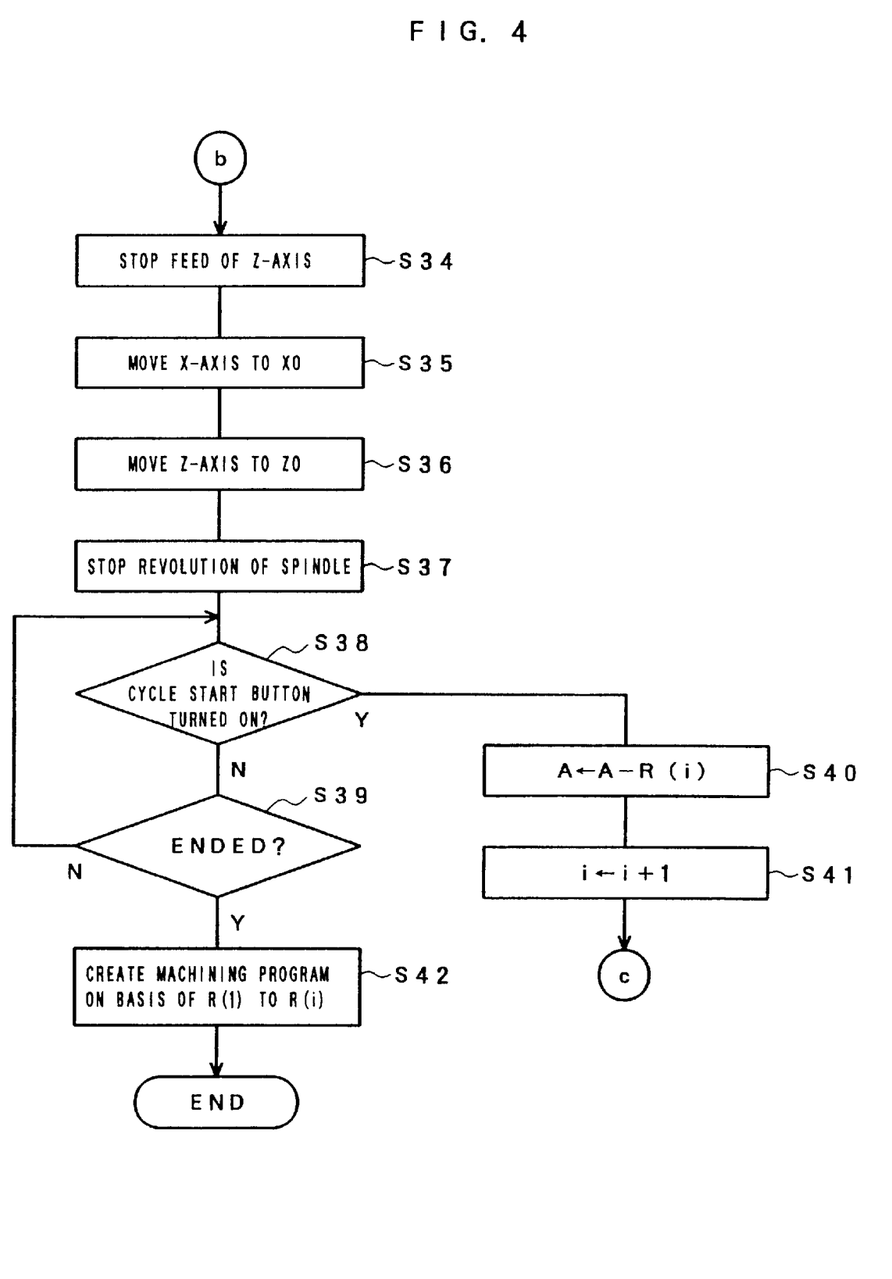
FIG. 4 is a flow chart subsequent to that shown in FIG. 3.

When the processor 11 starts the processing shown in FIGS. 2 to 4, and the operator presses a cycle start button of a control panel, the processor 11 detects through the decision processing in Step S1 that the cycle start button is pressed, then stores values of current positions Zn and Xn of Z and X axes of the tool in machining start point storage registers Z0 and X0 (Step S2) and stores a value X1 of the work outer diameter as an initial value in a thread cutting start point storage register A (Step S3). Further, the processor 11 initializes a cutting time storage index i to 1 (Step S4), starts revolution of the spindle, i.e., the work at a predetermined speed RC (Step S5) and is placed in a standby state until a move command pulse is inputted from the manual pulse generator 73 for X axis or a thread cutting start button is pressed (repetitive processing in Steps S6 and S15).

Subsequently, the operator operates the manual pulse generator 73 for X axis to start an approach operation of the tool. After the processor 11 has detected through the decision processing in Step S6 that the move command pulse is inputted from the manual pulse generator 73, the processor 11 decides as to whether or not a moving destination Xn+ΔX of the tool by the move command ΔX is on the outside of a position stored in the thread cutting start point storage register A in the work radial direction (Step S7). When Xn+ΔX≧A, i.e., the destination of the tool is on the outside of the thread cutting start point, the processor 11 moves the tool to the position of Xn+ΔX on the basis of this move command ΔX (Step S8) and updates a value of a current position storage register Xn into Xn+ΔX (Step S9).

On the other hand, when it is decided in Step S7 that the destination Xn+ΔX of the tool is on the inside of the thread cutting start point A in the work radial direction, the processor 11 decides as to whether or not a forced cutting button of the control panel is pressed (Step S10). Then, when the forced cutting button is not pressed, the processor 11 further decides as to whether or not a cutting button of the control panel is pressed (Step S11). When neither the forced cutting button nor the cutting button is pressed, the processor 11 decides as to whether or not the move command ΔX detected in Step S6 is positive (Step S14). Only when the move command ΔX is positive, that is, a command for moving the end of the tool outward in the work radial direction, the processor 11 permits a movement of the tool and executes the processing in Steps S8 and S9 similarly to the above to update and store the current position of the tool after moving the tool.

Further, when the result of decision in Step S14 is false, that is, the move command ΔX is negative, in other words, a command for moving the end of the tool inward in the work radial direction, the processor 11 ignores this command and neither moves the tool nor updates the current position. That is, no matter where the current position of the tool is, a manual operation to allow the end of the tool to escape outward in the work radial direction is made entirely at will, while an operation to move the end of the tool more inward in the work radial direction is inhibited at all from being performed across the thread cutting start point A or in an area on the inside of the thread cutting start point A in the work radial direction on condition that neither the forced cutting button nor the cutting button is pressed.

Further, when the cutting button of the control panel is pressed, that is, the result of decision in Step S11 is true, the processor 11 further decides as to whether or not the moving destination Xn+ΔX of the tool by the move command ΔX is on the outside of a radius X1−H of a final finished dimension of a minor diameter of the thread shape in the work radial direction (Step S12). When the moving destination Xn+ΔX of the tool is on the outside of the above radius, the processor 11 permits the movement of the tool and executes the processing in Steps S8 and S9 similarly to the above to update and store the current position of the tool after moving the tool.

On the other hand, when the result of decision in Step S12 is false, that is, the moving destination Xn+ΔX of the tool by the move command ΔX is on the inside of the radius X1−H of the final finished dimension of the minor diameter of the thread shape in the work radial direction, the processor 11 replaces a value of the command ΔX by (X1−H)−Xn (Step S13), makes a correction such that the value calculated as the destination of the tool through the processing in Step S8 becomes equal to X1−H, that is, the radius as a final finished dimension of the minor diameter of the thread shape, and executes the processing in Steps S8 and S9 similarly to the above to update and store the current position of the tool after moving the tool.

Accordingly, when the cutting button of the control panel is pressed, it becomes possible to move the tool inward in the work radial direction by placing a limit on the radius X1−H as a final finished dimension of the minor diameter of the thread shape, irrespectively of the value of the thread cutting start point A.

Further, when the forced cutting button of the control panel is pressed, that is, the result of decision in Step S10 is true, the processor 11 executes the processing in Steps S8 and S9 unconditionally in response to the operation of the manual pulse generator 73 for X axis to move the tool in the work radial direction according to the operation of the manual pulse generator 73 by the operator, irrespectively of the thread cutting start point A and the radius X1−H as a final finished dimension of the minor diameter of the thread shape.

Accordingly, when the approach operation of the tool is performed by a manual operation from a machining start point (Z0, X0) to the thread cutting start point (Z0, A), it may be sufficient for an operator to release his hand from the forced cutting button and the cutting button and then operate only a handle of the manual pulse generator 73 so as to move the tool inward (i.e., a direction of −X) in the work radial direction until the movement of the tool is stopped, and as a result, the tool is automatically stopped at a position of (Z0, A). As has been described above, the value of A in this stage is equal to the radius X1 of the work.

Incidentally, in case where the controller 100 having a function to display the current position of the tool is equipped with an incremental display function which is reset when the position of the tool in the X axial direction agrees with A, in addition to display of an absolute position of a machine coordinate system, it is possible to grasp a depth of cut in newly applied through cutting more easily. It is sufficient for the controller having a scale of a manual reset type to reset display of the scale when the tool is automatically stopped at the position of (Z0, A).

Further, when the operator presses the thread cutting start button of the control panel, the processor 11, detecting through the decision processing in Step S15 that the thread cutting start button is pressed, is placed in a stand-by state until one revolution signal from the position coder 63 is detected, then starts drive of the servo motor 50 for Z axis simultaneously with the detection of this one revolution signal and starts feed of the tool in the direction of −Z at a speed of RC·ZR/60 (Step S16). The spindle revolving speed is given by RC (rpm), and therefore, if the tool is fed in the Z-axial direction at a speed of RC·ZR/60 (mm/sec), the end of the tool is spiraled relatively to the work at a pitch corresponding to the thread lead ZR. This is the basic spiral operation of the tool corresponding to the thread shape. Incidentally, the position of the tool moved in the Z-axial direction is automatically updated and the updated position is stored in a current position storage register Zn.

A description will now be given of how to cut the work by a manual operation in brief. As has been described above, if the operator operates the handle of the manual pulse generator 73 for X axis with the cutting button of the control panel pressed, it is possible to cut the work to a depth corresponding to the position of the radius X1−H as a final finished dimension of the minor diameter of the thread shape, that is, to a depth corresponding to the thread, height H at the maximum. In case where the thread has a small height H enough to complete thread cutting by single operation obviously, it is a matter of course that the work may be cut to the depth corresponding to the thread height H in the stage before the operation to press the thread cutting start button. When feeding the tool inward in the work radial direction up to a limit position in the X-axial direction by operating the handle of the manual pulse generator 73 for X axis with the cutting button of the control panel pressed, the work is cut to this depth automatically. Since the tip of the tool has been retreated from the end of the work in the direction of +Z, the tool does not come into contact with the end of the work actually until the tool is fed in the direction of −Z to some degree.

However, when excessive cutting is made by mistake in case where the work is made of a hard material, or the operator has no experience in cutting such a hard material, the tool or the work is in danger of being damaged. Further, when the operator tries to cut the work to the bottom by single operation in case where the thread has a large height H, there is also possibility that a problem similar to the above arises.

In such a case, therefore, it is necessary to perform thread cutting in several operations. In the first operation, it is preferable to cut the work to an obviously safe depth in the stage before depressing the thread cutting start button, and gradually increase an amount of cutting while observing the cutting conditions from the point at which the tool has begun to come into contact with the work actually after the thread cutting start button is depressed, or alternatively, press the thread cutting start button without cutting the work at all in the first stage, and then gradually cut the work while observing the cutting conditions from the point where the tool has begun to come into contact with the work actually.

However, even if cutting is made smoothly, a depth of cut should not be increased unnecessarily in the course of a cutting operation. If the operator gradually increases the depth of cut while observing the cutting conditions, an uncut portion may be left on the end of the work relatively to such depth of cut. For instance, assuming that a depth of cut in the thread cutting start position is set to 0, and a depth of cut in the thread cutting finish position is set to 2 mm, an uncut portion of 2 mm in thickness is left on the end of the work relatively. In the embodiment, the X-axis coordinate value of the tool at the thread cutting finish position for each thread cutting operation is at least adopted as the X-axis coordinate value A of the thread cutting start point for the next thread cutting operation, so that if a large uncut portion is left in the initial stage of the preceding thread cutting operation, mere feeding of the tool in the X-axial direction up to the cut position A to be regarded as a safety position for the next thread cutting operation might cause danger of damaging the tool or the work due to overload in the initial stage of starting cutting. Then, it is necessary for the operator to perform an appropriate operation in consideration of these disadvantages.

An operation to feed the tool in the X-axial direction after starting the feed in the Z axis, that is, after starting the thread cutting, is exactly similar to the approach operation described above, and the processor 11 executes the processing in Steps S18 to S25 similar to that in Steps S7 to S14 described above, every time the processor detects the move command issued from the manual pulse generator 73 for X axis (Step S17) after starting the thread cutting in Step S16.

Subsequently, the processor 11 decides as to whether or not the command for chamfering the work is stored in the RAM 13 (Step S26). When the above command is not stored in the RAM 13, the processor 11 decides as to whether or not a current position Zn of the tool in the Z-axial direction reaches a thread cutting finish point Z2 (Step S28). When the current position Zn of the tool does not reach the thread cutting finish point Z2, the processor 11 returns to the processing in Step S17 and repeatedly executes the processing similar to the above until the current position Zn of the tool reaches the thread cutting finish point Z2.

When the current position Zn of the tool finally reaches the thread cutting finish point Z2, the processor 11 reads a current position Xn of the tool in the work radial direction on this occasion, then obtains a depth of cut in the current thread cutting by subtracting the current position Xn of the tool from the X-axial coordinate value A of the thread cutting start point, and stores the resultant value in the depth storage register R(i) (Step S33). Since the depth of cut ought to be completely adjusted by the operator before the current position Zn of the tool reaches the thread cutting finish point Z2, the depth of cut in the thread cutting finish point Z2 is represented by a depth of cut R(i) in the current thread cutting operation.

On the other hand, when the command for chamfering the work is detected through the decision processing in Step S26, the processor 11 decides as to whether or not the current position Zn of the tool reaches a chamfering start position (Step S27). When the current position Zn of the tool does not reach the chamfering start position, the processor returns the processing to Step S17 and repeatedly executes the processing similar to the above until the current position Zn of the tool reaches the chamfering start position. Then, when the current position Zn of the tool reaches the chamfering start position, the processor 11 reads the current position Xn of the tool in the work radial direction on this occasion, then obtains a depth of cut in the current thread cutting by subtracting the current position Xn of the tool from the X-axial coordinate value A of the thread cutting start point and stores the resultant value in the depth storage register R(i) (Step S29). Further, the processor 11 starts synchronous control of X axis to the feed of Z axis (Step S30), continuously performs recessing of thread by means of chamfering until the current position Zn of the tool reaches the thread cutting finish point Z2 (Step S31), and ends the operation to allow the tool to escape in the X axis in the stage as soon as the current position Zn of the tool reaches the thread cutting finish point Z2 (Step S32). Since the depth of cut should have been completely adjusted by the operator before the current position Zn of the tool reaches the chamfering start position, the depth of cut in the chamfering start position is represented by the depth of cut R(i) in the current thread cutting operation.

The processor 11, having completely performed single thread cutting operation from the thread cutting start point Z0 to the thread cutting finish point Z2 in this manner, stops the feed in the Z-axial direction (Step S34), retreats the tool to the position of (Z2, X0) (Step S35), further returns the tool to the position of the machining start point (Z0, X0) (Step S36), then stops the revolution of the spindle (Step S37) and waits until the cycle start button of the control panel is pressed again (Step S38) or a semiautomatic operation end key is pressed (Step S39).

As has been described above, when the work is made of a hard material or thread has a large height H, it is sometimes necessary to perform thread cutting in several operations, and in such a case, the operator needs to press the cycle start button again.

The processor 11, having detected through the decision processing in Step S28 that the cycle start button is pressed, subtracts the depth of cut R(i) from the X-axis coordinate value A of the machining start point in the current thread cutting operation, updates and stores the resultant value as a value, which regulates a limit of the manual feed operation in the machining start point in the next thread cutting operation, in the register A (Step S40), increments a value in the cutting time storage index i by 1 (Step S41), thereafter returns the processing to Step S5 to start the revolution of the spindle and executes the processing similar to the above.

Although the operator operates the handle of the manual pulse generator 73 again to move the tool from the machining start point (Z0, X0) to the thread cutting start point in the next thread cutting operation, feeding of the tool inward in the work radial direction is regulated by the value in the machining start point storage register A so as to keep the tool outside of the position A in the work radial direction unless the cutting button or the forced cutting button of the control panel is pressed, with the result that it is possible to prevent a failure such as excessive cutting which is made carelessly by manual feed. Unless the cutting button or the forced cutting button of the control panel is pressed, the limit of feed of the tool in the X-axial direction regulated according to the value in the machining start point storage register A is placed on the outer diameter of the work in the first thread cutting operation, while being placed on the X-axial coordinate value (provided that the X-axial coordinate value immediately before the start of chamfering is used when chamfering is set) at the thread cutting finish point in the immediately preceding thread cutting operation for and after the second thread cutting operation.

Further, although the operator operates the manual pulse generator 73 with the cutting button pressed similarly to the above to cut the work to an appropriate depth and then presses the thread cutting start button to start the thread cutting operation. However, the feed in the Z-axial direction is started in synchronization with one revolution signal of the spindle, and therefore, it is not feared that a cutting edge of the tool is deviated from a predetermined position even if the thread cutting operation is performed many times over.

Subsequently, the operator repeatedly performs the thread cutting operation by required number of times in the similar manner to the above and ends the semiautomatic operation finally in the stage in which cutting of the work from the work outer diameter by the depth corresponding to the thread height H (Step S39).

Since the limit of the feed of the tool in the X-axial direction in case of operating the manual pulse generator 73 with the cutting button pressed agrees with the radius X1–H as a final finished dimension of the thread root, the operator can obtain an appropriate finished dimension only by operating the manual pulse generator 73 with the cutting button pressed so as to feed the tool manually to the limit of the feed of the tool in the X-axial direction, in the approaching stage of the final thread cutting operation, in which only a small portion of the work to be cut is left.

Further, it is possible that an insufficient cut is caused by flexure of the work in the final cutting stage, but in such a case, the work may be subjected to final thread cutting by pressing the forced cutting button of the control panel so as to drive the end of the tool to the inside of the radius X1–H as a final finished dimension, in the work radial direction.

The processor 11, having detected through the decision processing in Step S39 that the semiautomatic operation is ended, creates a thread cutting program for a full automatic operation according to a method similar to the prior art on the basis of the values R(1) through R(i), the depth of cut found in each thread cutting operation, predetermined thread shape data and data on the spindle revolving speed and the like, and causes an external storage device or the like to store the generated thread cutting program (Step S42).

That is, a work made of a special material or hard to be cut may be subjected to model thread cutting by a skilled operator, and the processor may automatically extract data representing a depth of cut required for the optimum thread cutting from the process of such model thread cutting and then may creates a full automatic operation program for mass production on the basis of the extracted data.

In the above embodiment, while the feed of the tool from the machining start point (Z0, X0) to the thread cutting start point (Z0, A) is always performed by the manual pulse generator 73, it may be possible to feed the tool automatically. For instance, the tool may be fed automatically with ease only by executing the processing to output a command for moving the tool to X=A to the servo motor 51 for X axis at a period of completion of the processing in Step S41.

What is claimed is:

1. A thread cutting method using a lathe which performs thread cutting by revolving a work mounted on a spindle of the lathe, then cutting the work by putting a tool into contact with the work from a direction orthogonal to the spindle, and moving the tool relatively to the work in a work axial direction in synchronization with the revolution of the spindle, comprising:

specifying various data used to perform thread cutting;

storing a machining program having a threading cycle which regulates a basic spiral operation of the tool, according to the specified various data; and controlling the tool to perform a thread cutting operation by executing said machining program to control the basic spiral operation of the tool operation while controlling a depth of cut for said thread cutting operation by moving the tool manually.

2. A thread cutting method using a lathe according to claim 1, further comprising:

storing the depth of cut determined by moving the tool manually by an operator during execution of said machining program in a controller; and determining a next thread cutting start point on the basis of the stored depth of cut.

3. A thread cutting method using a lathe according to claim 1, wherein said storing a machine program comprises storing an operation to move the tool relatively to the work from a thread cutting start point to a thread cutting end point, and an operation to retreat the tool from the thread cutting end point to a machining start point, and further comprising:

manually regulating a limit position of an approach operation for moving the tool from the machining start point to the thread cutting start point according to a position of the thread cutting start point determined on the basis of said depth of cut; and manually removing the regulation on the limit position.

4. A numerical controller for controlling a lathe to perform thread cutting, comprising:

a machining program storage means for storing an automatic operation program of a thread cutting cycle;

an input unit having a display screen to input and display various data required for execution of said automatic operation program;

a data storage means for storing the data inputted from said input unit having a display screen;

a manual pulse handle for moving a thread cutting tool by a manual operation in a cutting direction relatively to a work mounted on a spindle; and a machining program creating means for creating a semi-automatic operation program for performing predetermined thread cutting to the work by applying data stored in said data storage means, except data representing a depth of cut for one machining cycle, and data representing a depth of cut corresponding to a manipulated variable of said manual pulse handle to the automatic operation program stored in said machining program storage means.

5. A numerical controller according to claim 4, further comprising:

a decision means for deciding whether a depth of cut commanded by said manual pulse handle exceeds a final depth of cut inputted by said input unit with display screen; and a depth regulating means for altering a current depth of cut into the final depth of cut automatically when said decision means decides that, with the current manipulated variable of said manual pulse handle, the depth of cut commanded by said manual pulse handle exceeds the final depth of cut.

6. A numerical controller according to claim 5, further comprising:

a regulation removing means for permitting cutting corresponding to the manipulated variable of the manual pulse handle without limitation by removing the regulation placed on the depth of cut by said depth regulating means.

7. A numerical controller according to claim 4, further comprising:

a typical depth storage means for, when a thread cutting operation in a machining cycle is ended, obtaining and storing a typical depth of cut in a thread cutting in the machining cycle; and a cutting depth regulating means for regulating the manipulated variable of said manual pulse handle such that the depth of cut commanded by said manual pulse handle does not exceed the typical depth of cut stored in said typical depth storage means in a thread cutting operation in a next machining cycle.

* * * * *